US005763120A

United States Patent [19]
Saidi et al.

[11] Patent Number: 5,763,120
[45] Date of Patent: Jun. 9, 1998

[54] LITHIUM MANGANESE OXIDE CATHODES WITH HIGH CAPACITY AND STABILITY

[75] Inventors: M. Yazid Saidi, Henderson, Nev.; Rene Koksbang, Odense, Denmark

[73] Assignee: Valence Technology, Inc., Henderson, Nev.

[21] Appl. No.: 673,649

[22] Filed: Jun. 25, 1996

[51] Int. Cl.$^6$ .................................................. H01M 4/50
[52] U.S. Cl. ............................................ 429/224; 429/217
[58] Field of Search ...................................... 429/224, 217

[56] References Cited

U.S. PATENT DOCUMENTS

| | | |
|---|---|---|
| 4,246,253 | 1/1981 | Hunter . |
| 4,828,834 | 5/1989 | Nagaura et al. . |
| 5,135,732 | 8/1992 | Barboux et al. . |
| 5,147,739 | 9/1992 | Beard . |
| 5,196,279 | 3/1993 | Tarascon . |
| 5,418,090 | 5/1995 | Koksbang et al. . |
| 5,425,932 | 6/1995 | Tarascon . |
| 5,605,773 | 2/1997 | Ellgen . |
| 5,631,104 | 5/1997 | Zhong et al. . |
| 5,639,438 | 6/1997 | Ellgen . |

OTHER PUBLICATIONS

J.M. Tarascon, E. Wang, F.K. Shokoohi, W.R. McKinnon, and S. Colson, "The Spinel Phase of $LiMn_2O_4$ as a Cathode in Secondary Lithium Cells", J. Electrochem. Soc., vol. 138, No. 10, 2859–2864, Oct. 1991.

J.M. Tarascon and D. Guyomard, "Li Metal–Free Rechargeable Batteries Based on $Li_{1+x}Mn_2O_4$ Cathodes ($0 \leq x \leq 1$) and Carbon Anodes", J. Electrochem. Soc., vol. 138, 10, 2864–2868, Oct. 1991.

J. Farcy, J.P. Pereira–Ramos, L. Hernan, J. Morales, and J.L. Tirado, "Cation–Deficient Mn–Co Spinel Oxides as Electrode Material for Rechargeable Lithium Batteries", Electrochimica Acta, vol. 39, No. 3, 339–345, 1994 (No month).

R.J. Gummow, A. deKock, M.M. Thackeray, "Improved Capacity Retention in Rechargeable 4 V Lithium/Lithium–Manganese Oxide (Spinel) Cells", Solic State Ionics, vol. 69, 1994, Feb.

H. Huang and P.G. Bruce, "A 3 Volt Lithium Manganese Oxide Cathode for Rechargeable Lithium Batteries", J. Electrochem. Soc., vol. 141, No. 7, Jul. 1994.

*Primary Examiner*—John S. Maples
*Attorney, Agent, or Firm*—Linda Deschere

[57] ABSTRACT

A method for reducing capacity fading of an $LiMn_2O_4$ spinel electrode active material comprising substituting a minor amount of Z for Mn in the $LiMn_2O_4$ active material, where Z is a metal element having a +4 (IV) valence state and is characterized by an ability to form tetravalent chlorides. The Z substituted $LiMn_2O_4$ active material is further characterized by a lesser rate of capacity loss with cycling as compared to $LiMn_2O_4$ active material.

10 Claims, 6 Drawing Sheets

//1

LITHIUM MANGANESE OXIDE CATHODES WITH HIGH CAPACITY AND STABILITY

FIELD OF THE INVENTION

This invention relates to electrochemical cells and batteries, and more particularly, to improved electrodes for such batteries.

BACKGROUND OF THE INVENTION

Lithium batteries are prepared from one or more lithium electrochemical cells. Such cells typically include an anode (negative electrode) of metallic lithium, a cathode (positive electrode) typically a transition metal chalcogenide and an electrolyte interposed between spaced apart positive and negative electrodes. The electrolyte typically comprises a salt of lithium dissolved in one or more solvents, typically nonaqueous (aprotic) organic solvents. By convention, during discharge of the cell, the negative electrode of the cell is defined as the anode. During use of the cell, lithium ions (Li+) are transferred to the negative electrode on charging. During discharge, lithium ions (Li+) are transferred from the negative electrode (anode) to the positive electrode (cathode). Upon subsequent charge and discharge, the lithium ions (Li+) are transported between the electrodes. Cells having metallic lithium anode and metal chalcogenide cathode are charged in an initial condition. During discharge, lithium ions from the metallic anode pass through the liquid electrolyte to the electrochemically active material of the cathode whereupon electrical energy is released. During charging, the flow of lithium ions is reversed and they are transferred from the positive electrode active material through the electrolyte and then back to the lithium negative electrode.

It has recently been suggested to replace the lithium metal anode with a carbon anode such as coke or graphite which are intercalation compounds. Such negative electrodes are used with lithium containing cathodes, in order to form an $Li_xC$ anode. Such cells, in an initial condition, are not charged. In order to be used to deliver electrochemical energy, such cells must be charged in order to transfer lithium to the carbon from the lithium containing cathode. During discharge the lithium is transferred from the anode back to the cathode. During subsequent recharge, the lithium is transferred back to the anode where it reintercalates into the carbon. Lithium manganese oxide represented by the general nominal formula $Li_xMn_2O_4$ is known to be an intercalation compound usable as a cathode material in a lithium battery. This material has been used as a positive electrode for batteries comprising lithium metal anodes as well as a positive cathode lithium source for lithium ion batteries, for example, comprising intercalation carbon electrodes as anodes.

Methods of synthesis for $Li_xMn_2O_4$ compounds are known and are reactions generally between stoichiometry quantities of a lithium containing compound and a manganese containing compound, exemplified by a lithium salt and manganese oxide. Common precursors are, for example, lithium salt and $MnO_2$ compounds as disclosed by Hunter in U.S. Pat. No. 4,246,253. However, such compounds prepared by conventional methods have a disadvantage in that the charge capacity of a cell comprising a cathode of such compounds suffers a progressive loss in capacity as the number of cycles of such cell increases. That is, although the initial capacity may be an acceptable value, such initial capacity value is diminished upon the first cycle of operation and such capacity further diminishes on every successive cycle of operation. Such capacity fading is well known and is calculated according to the equation:

Equation I $$\frac{((FC \text{ charge capacity}) - (FC \text{ discharge capacity})) \times 100\%}{FC \text{ charge capacity}}$$

where FC stands for first cycle. The above expression is used to calculate first cycle capacity loss. For example, an electrode having a specific electrode capacity of 100 mAhr/g and a first cycle discharge capacity of 60 mAhr/g, has a 40 percent first cycle capacity loss or fade. This same equation is also used to calculate subsequent progressive capacity loss during subsequent cycling relative back to the first cycle capacity charge reference. Accordingly, for example, the tenth cycle capacity loss would be expressed as:

Equation II $$\frac{[(FC \text{ charge capacity}) - (C_{10} \text{ discharge capacity})] \times 100\%}{FC \text{ charge capacity}}$$

where $C_{10}$ refers to cycle 10. In U.S. Pat. No. 4,828,834 Nagaura et al attempted to reduce capacity fading by sintering precursor lithium salt and $MnO_2$ materials and thereby forming an $LiMn_2O_4$ intercalation compound. However, Nagaura's $LiMn_2O_4$ compounds were not fully crystallized spinel electrodes and suffered from a very low capacity. Despite the above approaches, there remains the difficulty of obtaining lithium manganese oxide based electrode materials having the attractive capacity of the basic spinel $Li_xMn_2O_4$ intercalation compound, but without its disadvantage of significant capacity loss on progressive cycling.

SUMMARY OF THE INVENTION

The present invention provides lithium manganese oxide based spinels wherein some of the manganese has been substituted by a metallic element having a +4 (IV) valence state in an amount which maintains the initial capacity of the $LiMn_2O_4$ and which surprisingly, at the same time, prevents capacity fading.

The method comprises substituting a minor amount of Z for Mn in the basic $LiMn_2O_4$ spinel structure, where Z is a metal element having a +4 (IV) valence state and is characterized by an ability to form tetravalent halides and, particularly, tetravalent chlorides. The Z substituted $LiMn_2O_4$ active material is advantageously characterized by a lesser rate of capacity loss with cycling (capacity fade) as compared to the conventional $LiMn_2O_4$ spinel. The Z substituted material of the invention is represented by the broad nominal general formula $Li_bMn_yZ_xO_4$, where b, x, and y are all greater than 0, desirably, b is greater than or equal to about 1, the sum of x plus y is about 2. Z is a metal element having a +4 (IV) valence state and characterized by an ability to form tetravalent chlorides. In one embodiment, the nominal general formula is $LiMn_yZ_xO_4$ where b is about 1, x and y are both greater than 0, the sum of x and y is about 2, and the atomic proportion of Mn is greater than that of Z (y greater than x).

It has been found that when Z is a metal element having a +4 (IV) valence state and is characterized by an ability to form tetravalent halides, and particularly, tetravalent chlorides, a significant advantage is achieved due to the significantly lesser rate of capacity loss with cycling as compared to the conventional $LiMn_2O_4$ spinel. Indeed, the amount of capacity loss with cycling is essentially zero so that essentially no capacity fading is observed with the material of the invention. In a preferred embodiment, the Z substituted active material is a compound where y is at least about 9 times greater than x ($y \geq 9x$), and most preferably y is at least 19 times x ($y \leq 19x$). A particularly preferred compound contains a proportion of Z where in the expression $Z_x$, x is less than or equal to about 0.2 and in the expression $Mn_y$, y is greater than or equal to about 1.8. More preferably x is less than or equal about 0.1 and y is greater than or equal to about 1.9 corresponding to $Li_bMn_{1.9}Z_{0.1}O_4$, and preferably is $LiMn_{1.9}Z_{0.1}O_4$.

It is preferred that the element Z be a metal element have a +4 (IV) valence state and selected from the group consisting of tin (Sn), titanium (Ti), zirconium (Zr), and hafnium (Hf). It is most preferred that Z be titanium or tin.

The invention provides an electrode active material $LiZ_xMn_yO_4$ which has a high initial capacity comparable to conventional $LiMn_2O_4$ but without the capacity fading observed with the conventional $LiMn_2O_4$. The initial capacity loss on first cycle for $LiMn_2O_4$ is dramatic and capacity is further reduced on progressive cycling. In contrast, the $LiZ_xMn_yO_4$ of the invention demonstrates essentially no first cycle capacity loss, essentially no loss with progressive cycling, and therefore, has at least a lesser rate of loss with cycling as compared to the conventional $LiMn_2O_4$. Thus, the invention at least achieves a lower percentage reduction in capacity with progressive cycling and at best achieves no loss of capacity with progressive cycling at least through 40 cycles. This demonstrates stable, extended capacities in excess of 120 mAh/gm.

In another embodiment, the $Li_bMn_2O_4$ has b greater than 1 and preferably equal to about 2, corresponding to $Li_2Mn_yZ_xO_4$. This provides excess lithium relative to manganese and Z. It is desired that Z be the metal as stated above, and preferably titanium (Ti), forming $Li_2MnTiO_4$. This provides a relatively rich lithium compound to further enhance cell performance.

Objects, features, and advantages of the invention include an improved electrochemical cell or battery based on lithium which has improved charging and discharging characteristics, a large discharge capacity, and which maintains its integrity over a prolonged life cycle as compared to presently used cathodes. Another object is to provide a cathode active material compound which provides the advantages of large discharge capacity and which maintains capacity over a prolonged life cycle with little to no capacity fading.

These and other objects, features, and advantages will become apparent from the following description of the preferred embodiments, claims, and accompanying drawings.

DETAILED DESCRIPTION OF THE PREFERRED EMBODIMENTS

Figure 1:
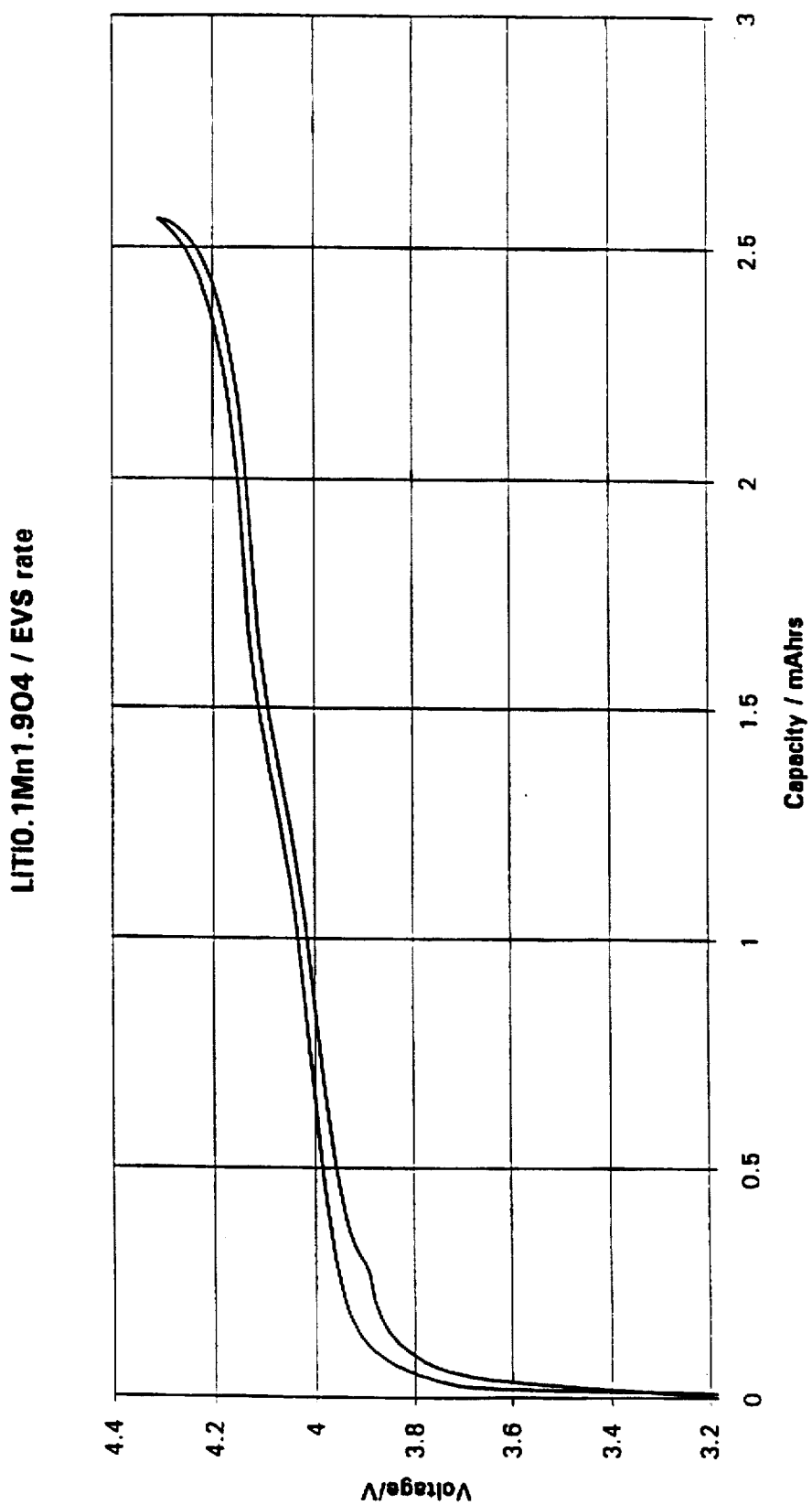
FIG. 1 shows a voltage profile of the test cell, based on the $LiTi_{0.1}Mn_{1.9}O_4$ positive electrode active material of the invention, and using a lithium metal counter-electrode as described in the Example. The data shown in FIG. 1 is based on the Electrochemical Voltage Spectroscopy (EVS) technique.

The present invention provides a method for reducing capacity fading of a $LiMn_2O_4$ spinel electrode active material. The method comprises substituting a minor amount of Z for Mn in the basic $LiMn_2O_4$ spinel structure, where Z is a metal element having a +4 (IV) valence state and is characterized by an ability to form tetravalent halides and, particularly, tetravalent chlorides. The Z substituted $LiMn_2O_4$ active material is advantageously characterized by a lesser rate of capacity loss with cycling (capacity fade) as compared to the conventional $LiMn_2O_4$ spinel. The Z substituted material of the invention is represented by the broad nominal general formula $Li_bMn_yZ_xO_4$, where b, x, and y are all greater than 0, desirably, b is greater than or equal to about 1, the sum of x plus y is about 2, Z is a metal element having a +4 (IV) valence state and characterized by an ability to form tetravalent chlorides. In one embodiment, the nominal general formula $LiMn_yZ_xO_4$ where b is about 1, x and y are both greater than 0, the sum of x and y is about 2, and the atomic proportion of Mn is greater than that of Z (y greater than x).

Before further describing the method of the invention and the compound used in the method for reducing capacity fading of an electrode active material, it is useful to understand more fully the problem to which the invention is directed. A number of attempts were made to increase the capacity of the basic, conventional $LiMn_2O_4$ spinel, yet such efforts further aggravate its capacity fading. Further, such typically increased capacity fading and resulted in a lesser initial capacity. Accordingly, such efforts were essentially counter-productive. For example, an attempt was made to boost initial capacity by changing the relative proportions of lithium, manganese, and oxygen in the $LiMn_2O_4$ by, for example, replacing some manganese with lithium, changing the amount of oxygen, synthesizing a cation deficient spinel where the amount of manganese and lithium were both diminished, replacing a small amount of lithium and manganese with another element which has a +2 (II) valence state. These approaches resulted in materials having a significantly lower initial capacity than the spinel $LiMn_2O_4$.

Before the present invention, the dilemma of solving the short lived capacity problem has heretofore not been solved. The present invention provides lithium manganese oxide based spinels wherein some of the manganese has been substituted by a metallic element having a +4 (IV) valence state in an amount which maintains the high characteristic initial capacity of the $LiMn_2O_4$ and which surprisingly, at the same time, prevents capacity fading.

As stated earlier, the Z substituted material of the invention is represented by the nominal general formula $LiMn_yZ_xO_4$ where x and y are both greater than 0, the sum of x and y is about 2, and the atomic proportion of Mn is greater than that of Z (y>x). It has been found that when Z is a metal element having a +4 (IV) valence state and is characterized by an ability to form tetravalent halides, and particularly, tetravalent chlorides, a significant advantage is achieved due to the significantly lesser rate of capacity loss with cycling as compared to the conventional $LiMn_2O_4$ spinel. Indeed, the amount of capacity loss with cycling is essentially zero so that essentially no capacity fading is observed with the material of the invention. In a preferred embodiment, the Z substituted active material is a compound where y is at least about 9 times greater than x (y>9x), and most preferably y is at least 19 times x (y>19x). A particularly preferred compound contains a proportion of Z where in the expression $Z_x$, x is less than or equal to about 0.2 and in the expression $Mn_y$, y is greater than or equal to about 1.8. More preferably x is less than or equal about 0.1 and y is greater than or equal to about 1.9 corresponding to $Li_bMn_{1.9}Z_{0.1}O_4$, and preferably is $LiMn_{1.9}Z_{0.1}O_4$.

It is preferred that the element Z be a metal element have a +4 (IV) valence state and selected from the group consisting of tin (Sn), titanium (Ti), zirconium (Zr), and hafnium (Hf). It is most preferred that Z be titanium or tin.

In another embodiment, the $Li_bMn_2O_4$ has b greater than 1 and preferably equal to about 2, corresponding to $Li_2Mn_yZ_xO_4$. This provides excess lithium relative to manganese and Z. It is desired that Z be the metal as stated above, and preferably titanium (Ti), forming $Li_2MnTiO_4$. This provides a relatively rich lithium compound to further enhance cell performance.

Positive electrode active materials were prepared and tested in electrochemical cells with results and comparative analysis as reported in FIGS. 1 to 5. The test cell configuration will be described with reference to FIG. 6. A description of the electrochemical cell or battery which uses the novel active material of the invention will now be described. By convention, an electrochemical cell comprises a first electrode, a counter-electrode which reacts electrochemically with the first electrode, and an electrolyte which is capable of transferring ions between the electrodes. A battery refers to one or more electrochemical cells. Referring to FIG. 6, an electrochemical cell or battery 10 has a negative electrode side 12, a positive electrode side 14, and an electrolyte/separator 16 therebetween. The negative electrode is the anode during discharge, and the positive electrode is the cathode during discharge. The negative electrode side includes current collector 18, typically of nickel, iron, stainless steel, and copper foil, and negative electrode active material 20. The positive electrode side includes current collector 22, typically of aluminum, nickel, iron, stainless steel, and copper, and such foils having a protective conducting coating foil, and a positive electrode active material 24. The electrolyte/separator 16 is typically a solid electrolyte, or separator and liquid electrolyte. Solid electrolytes typically refer to polymeric matrixes which contain an ionic conductive medium. Liquid electrolytes typically comprise a solvent and an alkali metal salt which form an ionically conducting liquid. In this latter case, the separation between the anode and cathode is maintained, for example, by a relatively inert layer of material such as glass fiber. The electrolyte is not an essential feature of the invention. Essentially, any ionically conducting electrolyte may be used. Essentially any method may be used to maintain the positive and negative electrodes spaced apart and electrically insulated from one another in the cell. Accordingly, the essential features of the cell are the positive electrode, a negative electrode electrically insulated from the positive electrode, and an ionically conducting medium between the positive and negative electrodes. Examples of a suitable separator/electrolyte, solvents, and salts are described in U.S. Pat. No. 4,830,939 showing a solid matrix containing an ionically conducting liquid with an alkali metal salt where the liquid is an aprotic polar solvent; and U.S. Pat. Nos. 4,935,317; 4,990,413; 4,792,504; and 5,037,712. Each of the above patents is incorporated herein by reference in its entirety.

Electrodes of the invention are made by mixing a binder, the active material, and carbon powder (particles of carbon). The binder composition is desirably a binder/electrolyte such as polymeric acrylates (plastics) which are x-linked by radiation curing or may be based on conventional electrolyte/binder systems. The binder/electrolyte is preferably the polymeric acrylate (plastic) with ionic conduction capability. After mixing, the resulting paste, containing the binder, active material, and carbon, is coated onto a current collector, and any polymer content is polymerized, and cross-linked by heat radiation or other curing means.

Positive Electrode

A positive electrode containing the $LiMn_yZ_xO_4$ active material of the invention is prepared by the following method. For the positive electrode, the content was as follows: 50 to 90 percent by weight active material ($LiMn_yZ_xO_4$); 5 to 30 percent carbon black as the electric conductive diluence; and 3 to 20 percent binder preferably chosen to enhance ionic conductivity. The stated ranges are not critical. The amount of active material may range from 25 to 85 weight percent. The formation of each electrode will now be described. The positive electrode was prepared from mixtures of lithium-manganese oxide (active material) and EPDM (ethylene propylene diene monomer) as the binder. Shawinigan Blacks was used as the carbon powder conductive diluent. The carbon powder conductive diluent is used to enhance electronic conductivity of the lithium-manganese oxide. Shawinigan Black®, available from Chevron Chemical Company, San Ramone, Calif., has a BET average surface area of about 70±5 square meters per gram. Other suitable carbon blacks are sold under the designation super p™ and Super S™ available from MMM, a subsidiary of Sedema, which carbons have BET surface areas of about 65±5 square meters per gram. (MMM has its headquarters in Brussels, Belgium.) Examples of suitable polymeric binders include EPDM (ethylene propylene diene termonomers), PVDF (polyvinylidene difluoride), ethylene acrylic acid copolymer, EVA (ethylene vinyl acetate copolymer), copolymer mixtures, and the like. It is desirable to use either PVDF available from Polysciences Corporation with a molecular weight of 120,000 or EPDM available from Exxon Corporation and sold under the designation EPDM 2504™. EPDM is also available from The Aldrich Chemical Company. The description of carbon powders and binders constitute representative examples and the invention is not limited thereby. For example, other carbon powders are available from Exxon Chemicals, Inc., Chicago, Ill. under the trade name Ketjen Black EC 600 JD® and polyacrylic acid of average molecular weight 240,000 is commercially available from BF Goodrich, Cleveland, Ohio under the name Good-Rite K702™. The positive electrodes of the invention comprised mixtures of the active material $LiMn_2O_4$, the binder (EPDM), and the carbon particles (Shawinigan Blacks). These were mixed and blended together with a solvent. Xylene is a suitable solvent. The mixture was then coated onto an aluminum foil current collector to achieve a desired thickness for the final electrode.

$LiMn_yZ_xO_4$

The $LiMn_yZ_xO_4$ compounds which form the basis of the active material for the cathode, are prepared by the following method. For $LiMn_ySn_xO_4$ stoichiometric amounts of precursors are reacted. The precursors are: for Li, $Li_2CO_3$; for Mn, $MnO_2$; for Sn (tin) the precursor is $SnO_2$. Tin is known to also have an oxidation state permitting the formation of mono-oxides such as SnO which is amphoteric, as is $SnO_2$. For $LiMn_yTi_xO_4$, stoichiometric amounts of precursors are also reacted. The precursors $Li_2CO_3$ and $MnO_2$ are used with $TiO_2$. The most stable oxidation state for titanium (Ti) results in the formation of stable $TiO_2$, however, it is known that the mono-oxide TiO is obtainable by reduction of $TiO_2$. The precursors have well known chemical characteristics and are commonly available from a number of sources.

The precursors $Li_2CO_3$, $MnO_2$, and $SnO_2$ are reacted at 850° C. for about 48 hours in air and then allowed to cool. This is a solid state reaction which is very simply undertaken. In the case of titanium, the $Li_2CO_3$, $MnO_2$, and $TiO_2$ are reacted at about 850° C. for 48 hours in air in a solid state reaction and likewise permitted to then cool. The $TiO_2$ (rutile) used in this example was purchased from Alfa Chemicals, and is 99+ percent pure according to manufacturer's specification. It is also possible to form the $LiMn_yZ_xO_4$ compound by mixing stoichiometric amounts as stated above and preheating to a temperature of about 450° C. for about 48 hours and then firing at 650° C. for another 48 hours. As can be appreciated, the alternative methods for making the compounds are not complex, and times and temperatures may be varied in order to accomplish the solid state reaction. In addition, other precursors may be used. For example, LiOH (lithium hydroxide) may be used in place of $LiCO_3$. Nitrate precursors may also be used.

The precursor lithium sources are: LiOH, $LiOH.H_2O$, $LiNO_3$, $Li_2O_2$, $Li_2CO_3$, respectively, lithium hydroxide, lithium nitrate, lithium oxide, and lithium carbonate. The precursor titanium sources are: $TiO_2$, $Li_2TiO_3$, Ti powder, and TiO, that is, titanium oxides, lithium titanium oxides, and metallic titanium powder. The precursor manganese sources are: $MnO_2$, $Mn_2O_3$, $MnCO_3$, Mn (acetate), $MnNO_3$, Mn powder, and MnO, that is, manganese oxides, manganese carbonate, manganese acetate ($Mn(CH_3COO)_2$), manganese nitrate, and metallic manganese powder.

$Li_2Mn_yZ_xO_4$

Formation of $Li_2Mn_yZ_xO_4$: a stoichiometric mixture of $Li_2TiO_3$ and Mn acetate is intimately mixed and ground for 30 minutes in acetone. The dried powder is pressed into pellets at a 10 to 15 tons per square inch. The pellets are placed in an alumina crucible and fired at 975° C. for 72 hours under a constant stream of argon. The procedure is repeated for a further 24 hours. The reaction tube is allowed to cool from 975° C. to 750° C. and quenched in air.

The compound $LiMn_2O_4$ contains Mn in 2 oxidation states: $Mn^{3+}$ and $Mn^{4+}$. When the lithium content in this compound is increased to $Li_2$, $Mn^{4+}$ is reduced to $Mn^{3+}$. By substitution of $Mn^{4+}$ with another, more stable 4+ ion, it is possible to increase the lithium content to 2 Li without reduction of the 4+ element, but rather by reduction of $Mn^{3+}$ to $Mn^{2+}$. An example is $Li_2TiMnO_4$ which contains $Ti^{4+}$ and $Mn^{2+}$. When $Ti^{4+}$ is inactive (only active at potentials below 1.5 volts versus lithium), 2 Li/Mn may be cycled. The corresponding capacity is about 300 mAh/g.

Electrolyte

The electrolyte used to form the completed cell was a combination of EC/DMC. That is, ethylene carbonate (EC) and dimethyl carbonate (DMC). The ratio of EC:DMC was about 2:1 by weight. Positive and negative electrodes were maintained in a separated condition using a fiber glass layer. Such separation can also be achieved using a layer of Celgard™, Hoechst—Celanese Corp., Celgard 2400™, porous polypropylene, 25 microns thick.)

Negative Electrode

The electrochemical cell used with the positive electrode and electrolyte may contain one of a variety of negative electrode active materials. In one embodiment, the negative electrode may be metallic lithium. In more desirable embodiments, the negative electrode is an intercalation active material, such as, metal oxides and graphite. When a metal oxide active material is used, the components of the electrode are the metal oxide, electrically conductive carbon black, and ionically conductive binder in the proportions as described above for the positive electrode. In a preferred embodiment, the negative electrode active material is graphite particles. For test purposes, for determining capacity of a positive electrode, test cells were fabricated using the lithium metal active material. Accordingly, the cells assembled for testing and the results described hereinbelow are based on the positive electrode active material comprising the $LiMn_yZ_xO_4$ of the invention tested against a lithium metal counter electrode. When forming cells for use as batteries, it is preferred to use a non-metallic intercalation electrode. The preferred negative electrode comprises about 80 to 95 percent by weight graphite particles, and more preferably about 90 percent by weight with the balance constituted by a binder. Preferably, the anode is prepared from a graphite slurry as follows. A polyvinylidene difluoride (PVDF) solution is prepared by mixing 300 grams of 120,000 MW PVDF (PolyScience) in 300 ml of dimethyl formamide. The mixture was stirred for 2 to 3 hours with a magnetic stirrer to dissolve all of the PVDF. The PVDF functions as a binder for the graphite in the anode. Next, a PVDF/graphite slurry is prepared by first adding 36 grams of graphite (SFG-15) into about 38.5 grams of the PVDF solution. The mixture is homogenized with a commercial homogenizer or blender. (For example, Tissue Homogenizer System from Cole-Parmer Instrument Co., Niles, Ill.). The viscosity of the slurry is adjusted to about 200 cp with additional PVDF solution. The slurry is coated onto a bare copper foil by standard solvent casting techniques, such as by a doctor blade type coating. (Alternatively, the slurry can be coated onto a copper foil having a polymeric adhesion promoter layer, described above.) In preparing the slurry, it is not necessary to grind or dry the graphite, nor is it necessary to add conductive carbon black to the graphite anode formulation. Finally, the electrodes are dried at approximately 150° C. for 10 hours to remove residual water prior to making the electrochemical cells.

EXAMPLE

The active material $LiMn_yZ_xO_4$ of the invention was prepared as described above with Z constituted by tin (Sn) or titanium (Ti). The precursors $Li_2CO_3$, $MnO_2$, and $SnO_2$ were reacted at 850° C. for about 48 hours in air and then allowed to cool. This was a solid state reaction which was very simply undertaken. In the case of titanium, the $Li_2CO_3$, $MnO_2$, and $TiO_2$ were reacted at about 850° C. for 48 hours in air in a solid state reaction and likewise permitted to then cool. In a particularly preferred test cell, the nominal formula for the cathode active material, in an initial condition, was $LiTi_{0.1}Mn_{1.9}O_4$. The positive electrode, as tested, comprised the active material at 87 percent by weight; carbon black (Shawanigan Black) 10 percent by weight; and 3 percent by weight EPDM binder. The electrolyte was the EC/DMC with fiber glass as its separator and $LiPF_6$ salt as the electrolyte. The counter electrode was metallic lithium.

The current density of the test cell was ±0.25 milliamps per square centimeter. The test cell is based upon 2.4 square centimeter positive electrode with an active material loading of about 5 to 10 milligrams per square centimeter. The electrode geometric area is about 2.4 square centimeters. The capacity was determined under constant current cycling of ±0.2 mA/cm$^2$ between 3.0 and 4.3 volts.

Various methods for fabricating electrochemical cells and for forming electrode components are described herein. The invention is not, however, limited by any particular fabrication method as the novelty lies in the unique negative electrode material itself and combination of positive and negative electrode materials. Accordingly, additional methods for preparing electrochemical cells and batteries may be selected and are described in the art, for example, in U.S. Pat. Nos. 5,435,054 (Tonder & Shackle); 5,300,373 (Shackle); 5,262,253 (Golovin); 4,668,595; and 4,830,939 (Lee & Shackle). Each of the above patents is incorporated herein by reference in its entirety.

Figure 2:
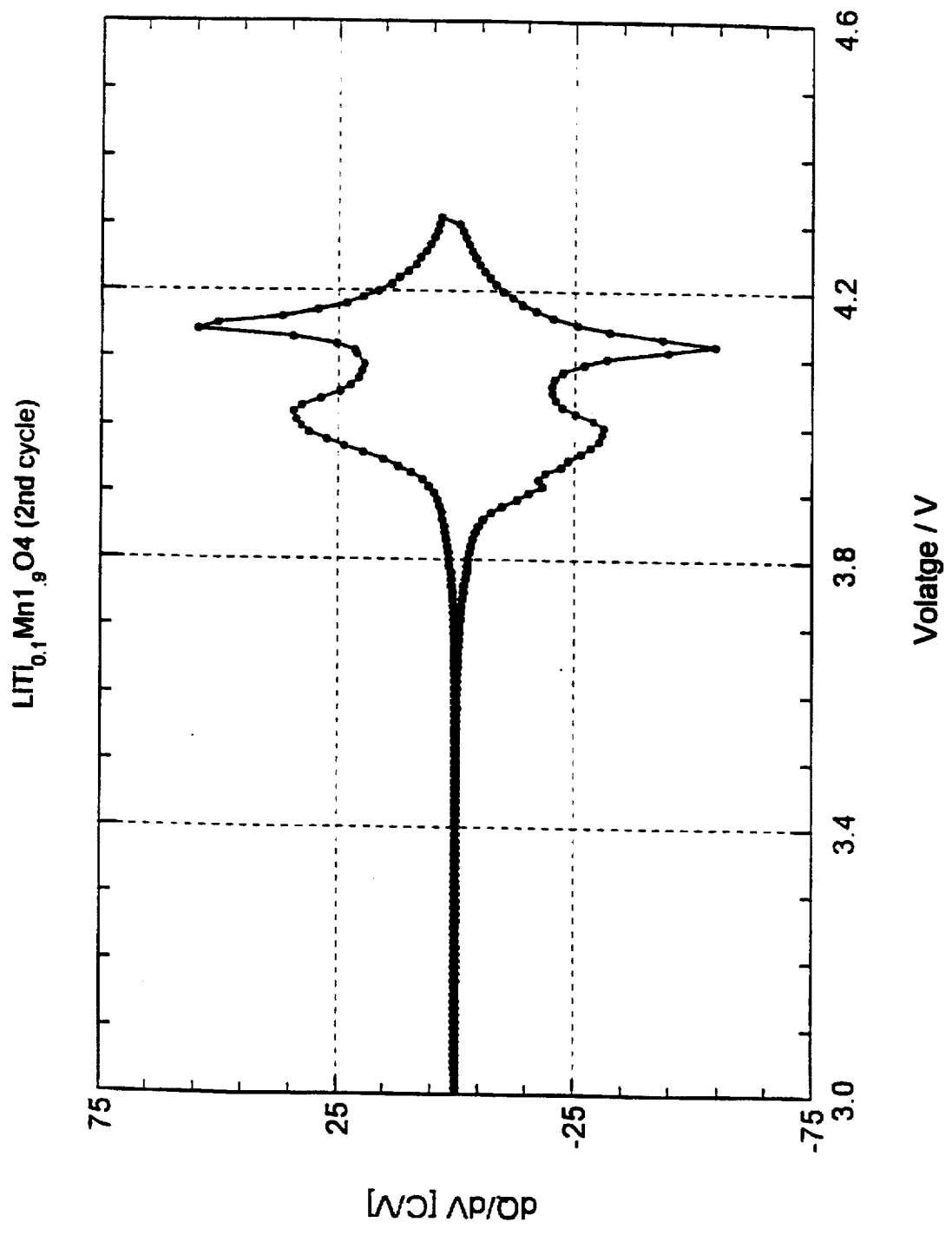
FIG. 2 is an EVS of a differential capacity plot based on FIG. 1.

FIG. 1 shows a voltage profile of the test cell, based on the LiTi$_{0.1}$Mn$_{1.9}$O$_4$ positive electrode active material of the invention, and using a lithium metal counter electrode as described in the Example. The data shown in FIG. 1 is based on the Electrochemical Voltage Spectroscopy (EVS) technique. Electrochemical and kinetic data were recorded using the Electrochemical Voltage Spectroscopy (EVS) technique. Such technique is known in the art as described by J. Barker in Synth. Met 28, D217 (1989); Synth. Met. 32, 43 (1989); J. Power Sources, 52, 185 (1994); and Electrochemica Acta, Vol. 40, No. 11, at 1603 (1995). FIG. 1 clearly shows and highlights the very high and unexpected degree of reversibility of the lithium ion reactions of the LiMn$_y$Z$_x$O$_4$ active material of the invention. The positive electrode showed a performance of about 128 milliamp hours per gram on the first discharge. In FIG. 1, the capacity in, is essentially 2.58 milliamp hours, and the capacity out, is essentially 2.55 milliamp hours, resulting in essentially no capacity change. The capacity remains unchanged (no capacity loss) even after 40 cycles. FIG. 2 is an EVS of a differential capacity plot based on FIG. 1. As can be seen from FIG. 2, the symmetrical nature of peaks indicates good electrical reversibility, small peak separations (charge/discharge), and correspondingly low voltage. There are essentially no peaks that can be related to irreversible reactions since all peaks above the axis (cell charge) have corresponding peaks below the axis (cell discharge).

Figure 3:
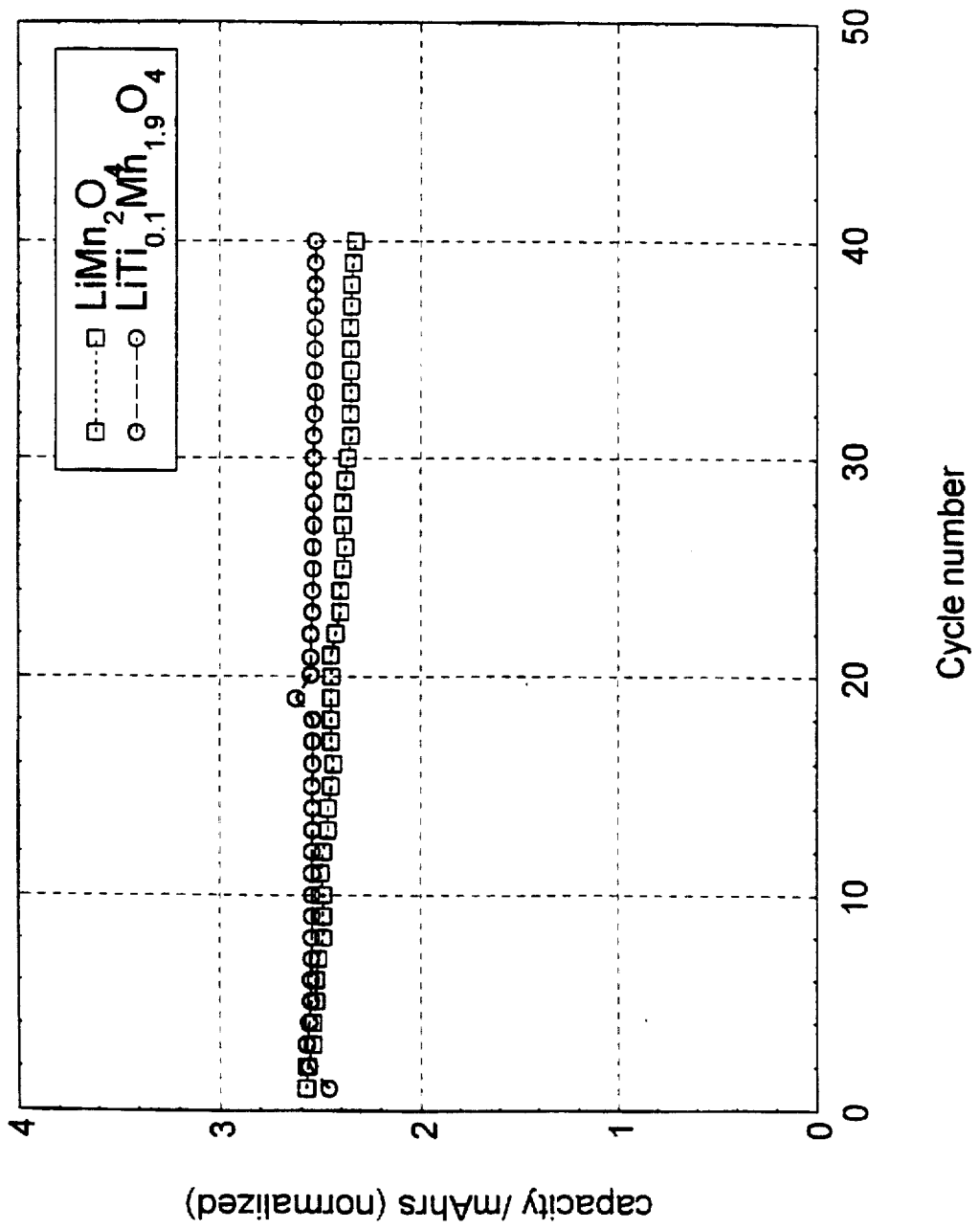
FIG. 3 shows the capacity in milliamp hours and cycling performance of the $LiTi_{0.1}Mn_{1.9}O_4$ active material for the positive electrode (data circles), and also shows the cycling performance of the conventional $LiMn_2O_4$ electrode (data squares); each at about 0.2 mA/cm².

FIG. 3 (circles) shows the capacity in milliamp hours of the LiTi$_{0.1}$Mn$_{1.9}$O$_4$ active material for the positive electrode. On a weight basis, the active material has a capacity of 132 milliamp hours per gram. This initial capacity is very attractive. FIG. 3 shows that the LiMn$_y$Z$_x$O$_4$ cathode of the invention has excellent rechargeability. FIG. 3 shows the excellent cycling and capacity of the cell. The capacity was determined at constant current cycling, +0.2 milliamp per centimeter square, for cycles 1 to 40; with a voltage range of 3.0 to 4.3 volts. As shown in FIG. 3, after up to 40 cycles, the capacity remains high at about 2.56 amp hours (about 132 milliamp hours per gram). The capacity loss is close to zero percent, meaning the reversible capacity is equal to the initial specific capacity. This performance is far in excess of the performance expected by a conventional LiMn$_2$O$_4$ electrode which progressively loses capacity on cycling. Accordingly, the results shown in FIG. 3 are truly advantageous and amazing, especially given that capacities are maintained over a large number of cycles.

The remarkable, advantageous performance of the manganese substituted positive electrode active material of the invention can be further appreciated by comparing the cycling performance of LiTi$_{0.1}$Mn$_{1.9}$O$_4$ FIG. 3 (circles) with the cycling performance of a conventional LiMn$_2$O$_4$ (FIG. 3, squares) electrode active material prepared and tested in the same manner as described in the Example. FIG. 3 (squares) shows the cycling performance of the convention LiMn$_2$O$_4$ electrode. As can be seen, the conventional, standard LiMn$_2$O$_4$ has an initial capacity of 2.58 milliamp hours. The capacity drops to 2.40 milliamp hours after 20 cycles. This is a loss of about 7 percent. After 40 cycles the capacity of the conventional, standard LiMn$_2$O$_4$ drops to 2.30 milliamp hours, corresponding to a capacity loss of about 10 percent.

Comparing FIG. 3 (circles) to FIG. 3 (squares), one can see that deterioration in discharge capacity due to the cyclic charging and discharging was not observed at all in the case of LiMn$_y$Z$_x$O$_4$ (LiTi$_{0.1}$Mn$_{1.9}$O$_4$, FIG. 3, circles) and this active material had truly superior properties when compared to the conventional LiMn$_2$O$_4$ (FIG. 3, squares).

Figure 4:
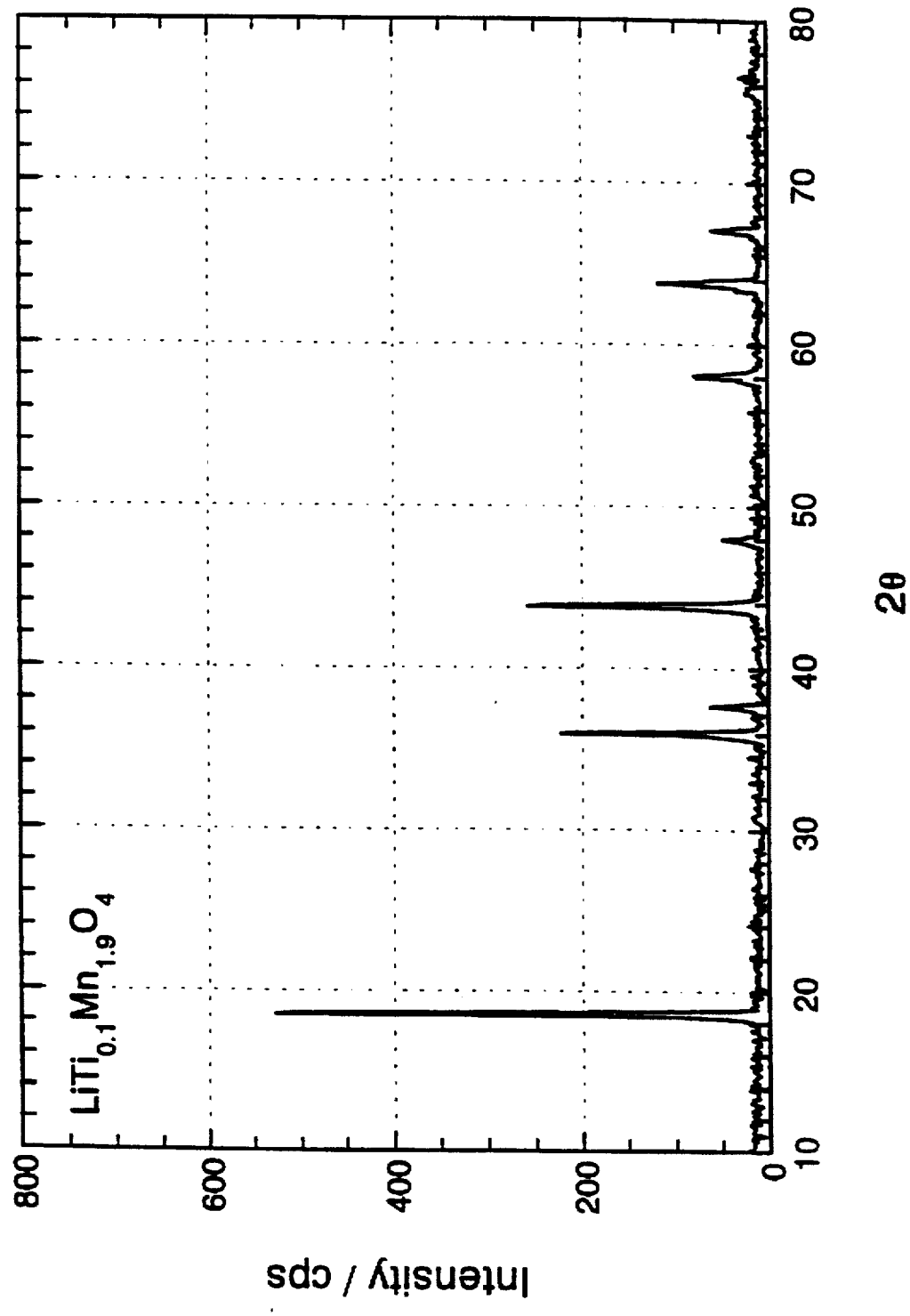
FIG. 4 shows the result of an x-ray diffraction analysis of the $LiMn_yZ_xO_4$ ($LiTi_{0.1}Mn_{1.9}O_4$) prepared according to the invention, conducted using the CuKα radiation, λ=1.5418Å type radiation.

FIG. 4 shows the result of an x-ray diffraction analysis of the LiMn$_y$Z$_x$O$_4$ (LiTi$_{0.1}$Mn$_{1.9}$O$_4$) prepared according to the invention. The analysis was conducted using CuKα type radiation.

Figure 5:
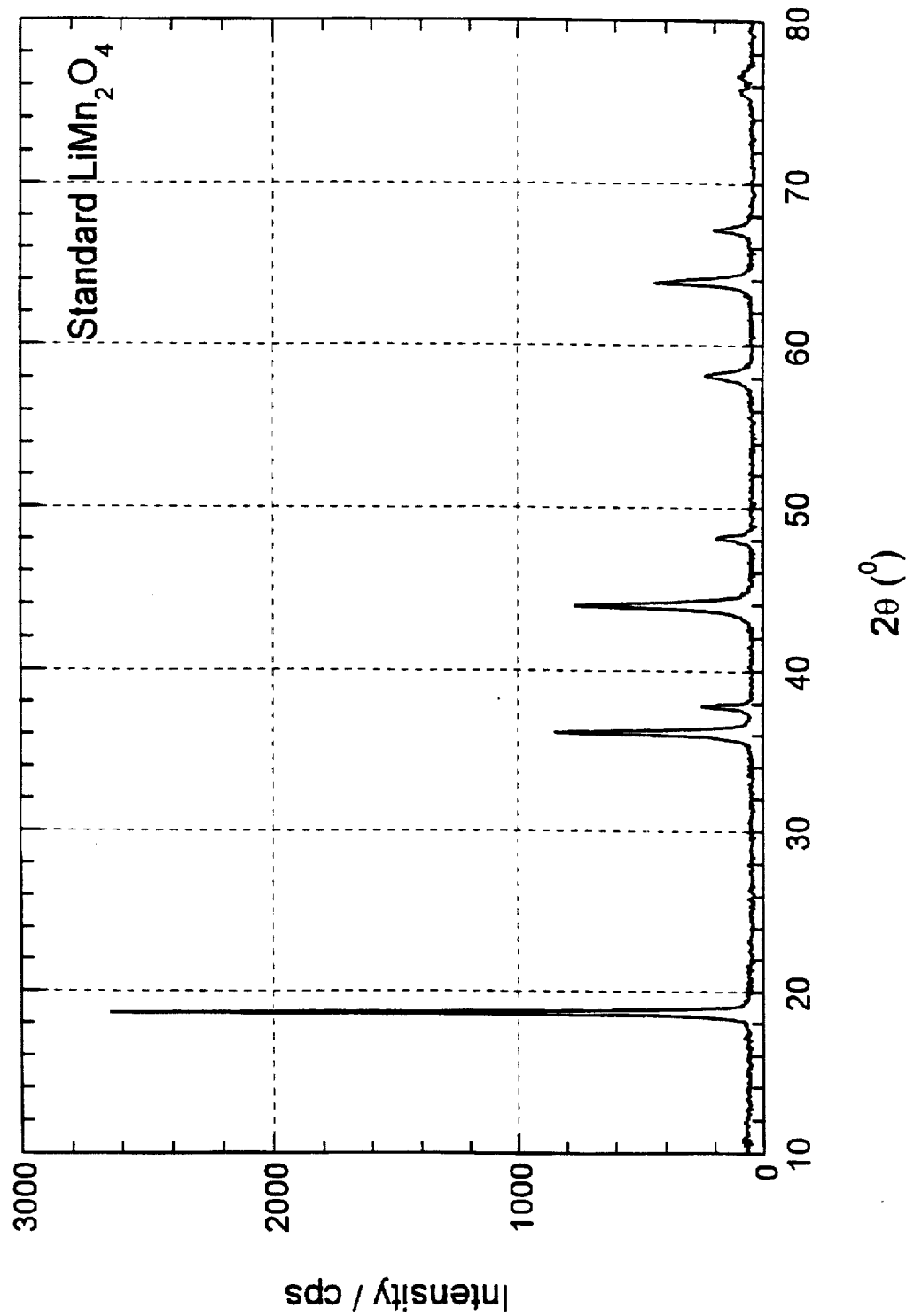
FIG. 5 shows the results of an x-ray diffraction analysis of conventional $LiMn_2O_4$. The analysis was conducted using the CuKa radiation type radiation.
Figure 6:
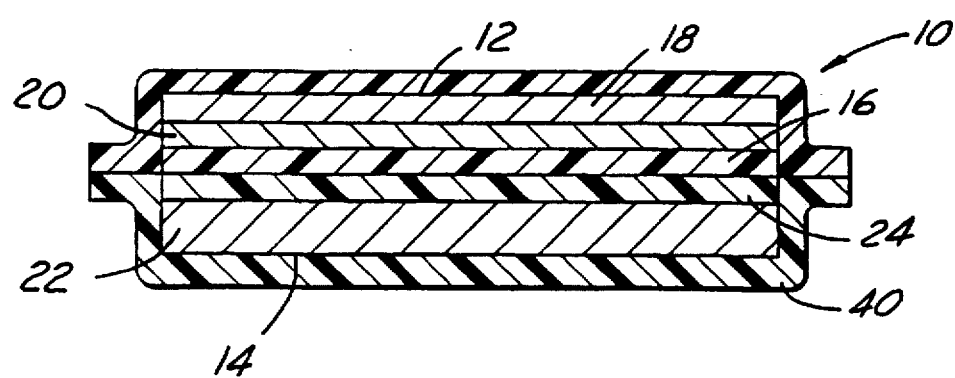
FIG. 6 is an illustration of a cross section of a thin battery or cell embodying the invention.

FIG. 5 shows the results of an x-ray diffraction analysis of conventional, standard LiMn$_2$O$_4$ synthesized from conventional precursors MnO$_2$, END (Electrolytic Manganese Dioxide), and LiOH by the conventional process of heating the precursors.

Comparing FIGS. 4 and 5 one can see that the LiTi$_{0.1}$Mn$_{1.9}$O$_4$ compound provides a pattern essentially identical to the LiMn$_2$O$_4$ conventional spinel. This is evidenced by the position of the peaks in terms of the scattering angle 2θ(theta), x-axis. The standard x-ray pattern for the conventional LiMn$_2$O$_4$ included for comparison (LiMn$_2$O$_4$, FIG. 5) shows the virtual identity of the invention product (LiZ$_x$Mn$_y$O$_4$, FIG. 4). The differences in intensities are related to the material morphology and crystallite size and how the sample is prepared for the x-ray analysis. The position and number of the peaks is the basis for comparison.

While not wishing to be held to any particular theory, the LiMn$_y$Z$_x$O$_4$ of the invention shows itself to be a defect spinel because some of the manganese has been substituted with another atom, a tetravalent atom. This creates a deficiency of lithium available. The formula of such materials can be written as:

assuming Ti$^{4+}$ enters the lattice as such and is unchanged, then it might substitute Mn$^{3+}$. If it enters the lattice as Ti$^{3+}$, then it would be written as:

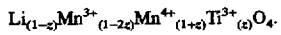

The last is less likely as the radii of Ti$^{3+}$ and Mn$^{3+}$ are not comparable (0.82 vs. 0.65Å). When this active material is used in a cell, the valence states which are thought to occur upon charge and discharge are as follows:

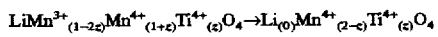

This assumes all the lithium is taken out, according to the extreme case. In the typical case, during cell operation, not all the lithium is removed so lithium is greater than zero.

The invention provides an electrode active material LiZ$_x$Mn$_y$O$_4$ which has a high initial capacity comparable to conventional LiMn$_2$O$_4$ but without the capacity fading observed with the conventional LiMn$_2$O$_4$. The initial capacity loss on first cycle for $LiMn_2O_4$ is dramatic and capacity is further reduced on progressive cycling. In contrast, the $LiZ_xMn_yO_4$ of the invention demonstrates essentially no first cycle capacity loss, essentially no loss with progressive cycling, and therefore, has at least a lesser rate of loss with cycling as compared to the conventional $LiMn_2O_4$. Thus, the invention at least achieves a lower percentage reduction in capacity with progressive cycling and at best achieves no loss of capacity with progressive cycling at least through 40 cycles. This demonstrates stable, extended capacities in excess of 120 mAh/gm.

While this invention has been described in terms of certain embodiments thereof, it is not intended that it be limited to the above description, but rather only to the extent set forth in the following claims.

The embodiments of the invention in which an exclusive property or privilege is claimed are defined in the following claims:

We claim:

1. A method for reducing capacity fading of an electrode having a $LiMn_2O_4$ spinel active material comprising: substituting a minor amount of Z for Mn in said $LiMn_2O_4$ active material, where Z is a metal element having a +4 (IV) valence state and is characterized by an ability to form tetravalent chlorides, wherein said Z substituted active material is a compound represented by the nominal general formula $LiMn_yZ_xO_4$, where x is less than 0.2 and y is greater than 1.8; providing an electrode comprising 50–90% by weight said $LiM_yZ_xO_4$ active material, 5–30% by weight electrically conductive diluent, and 3–20% by weight polymeric binder; and cycling said electrode at least 30 cycles; whereby said Z substituted $LiMn_2O_4$ active material is further characterized by less capacity loss after over 30 cycles as compared to $LiMn_2O_4$ active material.

2. The method according to claim 1 where x is less than or equal to about 0.1 and y is greater than or equal to about 1.9.

3. The method according to claim 1 where Z is a tetravalent ion selected from the group consisting of tin (Sn), titanium (Ti), zirconium (Zr), and hafnium (Hf).

4. The method according to claim 1 where Z is titanium (Ti).

5. The method according to claim 1 where Z is tin (Sn).

6. A method for forming a battery electrode having less capacity loss after cycling as compared to an electrode having an $LiMn_2O_4$ spinel active material, said method comprising forming an active material which comprises a compound represented by the general formula $LiMn_yZ_xO_4$, where said Z is a metal element having a +4 (IV) valence state and is characterized by an ability to form tetravalent chlorides, where x is less than 0.2 and y is greater than 1.8; and forming an electrode comprising 50–90% by weight said $LiM_yZ_xO_4$ active material, 5–30% by weight electrically conductive diluent, and 3–20% by weight polymeric binder; said $LiMn_yZ_xO_4$ active material characterized by less capacity loss after over 30 cycles as compared to $LiMn_2O_4$ active material.

7. The method compound according to claim 6 where x is less than or equal to about 0.1 and y is greater than or equal to about 1.9.

8. The method according to claim 6 where Z is selected from the group consisting of tin (Sn), titanium (Ti), zirconium (Zr), and hafnium (Hf).

9. The method according to claim 6 where Z is titanium (Ti).

10. The method according to claim 6 where Z is tin (Sn).

* * * * *